US006993014B2

(12) United States Patent
Bedingfield et al.

(10) Patent No.: US 6,993,014 B2
(45) Date of Patent: Jan. 31, 2006

(54) METHOD AND APPARATUS FOR ALLOWING SELECTIVE DISPOSITION OF AN INCOMING TELEPHONE CALL DURING AN INTERNET SESSION

(75) Inventors: James Carl Bedingfield, Lilburn, GA (US); Robert A. Koch, Norcross, GA (US); Alexander David Raji, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 585 days.

(21) Appl. No.: 10/073,451

(22) Filed: Feb. 11, 2002

(65) Prior Publication Data

US 2002/0085542 A1    Jul. 4, 2002

Related U.S. Application Data

(63) Continuation of application No. 08/991,079, filed on Dec. 16, 1997, now Pat. No. 6,757,274.

(51) Int. Cl.
*H04L 12/66*        (2006.01)

(52) U.S. Cl. ...................................... 370/352
(58) Field of Classification Search ............... 370/352, 370/353, 354, 355, 356, 475, 522; 379/211.02, 379/215.01, 21
See application file for complete search history.

(56) References Cited

U.S. PATENT DOCUMENTS

| | | | |
|---|---|---|---|
| 5,724,412 A | | 3/1998 | Srinivasan |
| 5,805,587 A | * | 9/1998 | Norris et al. ............... 370/352 |
| 5,809,128 A | | 9/1998 | McMullin |
| 5,896,444 A | | 4/1999 | Perlman et al. |
| 5,982,774 A | * | 11/1999 | Foladare et al. ............ 370/401 |
| 5,999,612 A | | 12/1999 | Dunn et al. |
| 6,028,917 A | * | 2/2000 | Creamer et al. ....... 379/100.01 |
| 6,067,353 A | | 5/2000 | Szeliga |
| 6,078,581 A | * | 6/2000 | Shtivelman et al. ......... 370/352 |
| 6,125,177 A | * | 9/2000 | Whittaker ................... 379/243 |

(Continued)

FOREIGN PATENT DOCUMENTS

WO      WO 97 22209      6/1997

(Continued)

OTHER PUBLICATIONS

"Did someone just call you? (How would you know?) Get the *Free* Internet Answering Machine," *CallWave, Inc. website page*, Mar. 3, 2000.

(Continued)

*Primary Examiner*—Kwang Bin Yao
(74) *Attorney, Agent, or Firm*—Walters & Zimmerman; Geoff Sutcliffe; Jennifer Medlin (57) ABSTRACT

A method for notifying an internet browser user of an incoming telephone call is performed by internet call notification software residing on the user's computer and software residing within a telephone network. A user selects the location of the internet notification software as a home page for the browser. The home page prompts the user for activation of internet call notification. If the user requests internet call notification, the software transmits an internet protocol address to the telephone network. The network then stores the internet protocol address for the user. When a call is made to the user, the telephone network accesses a database to retrieve the stored internet protocol address. The network then transmits a message to the user's software to notify the user of the incoming call. The software displays a window containing information about the telephone call. If the user chooses to accept the call, the software closes the browser and connects the telephone call to the user.

11 Claims, 5 Drawing Sheets

U.S. PATENT DOCUMENTS

| | | |
|---|---|---|
| 6,144,644 A | 11/2000 | Bajzath et al. |
| 6,212,261 B1 | 4/2001 | Meubus et al. |

FOREIGN PATENT DOCUMENTS

| | | |
|---|---|---|
| WO | WO 97 26749 | 7/1997 |
| WO | WO 97 47118 | 12/1997 |
| WO | WO 98/01985 | 1/1998 |

OTHER PUBLICATIONS

"Did someone just call you? Free Internet Answering Machine," *CallWave, Inc. website page*, Mar. 3, 2000.

"Customer Care, Internet Answering Machine User Guide," *CallWave, Inc. website* pp. 1-4, Mar. 3, 2000.

"Company Info, About Us," *CallWave, Inc. website page*, Mar. 3, 2000.

"Kiss your second line goodbye," *America's Network website* pp. 1-2, (CallWave, Inc.), Feb. 1, 2000.

"Heard on the Beat: Technology: Call Waiting? PC Will Deliver Message," *Los Angeles Times Find website page*, (CallWave, Inc.), Oct. 4, 1999.

"pagoo™ The answer to missed calls while you're online.™ Are you missing phone calls while you're online?," *Pagoo.com, Inc. website page*, Mar. 3, 2000.

"pagoo™ The answer to missed calls while you're online.™ Pagoo Call Catcher™," *Pagoo.com, Inc. website page*, Mar. 3, 2000.

"pagoo™ The answer to missed calls while you're online.™ About Pagoo," *Pagoo.com, Inc. website* pp. 1-2, Mar. 3, 2000.

"pagoo™ The answer to missed calls while you're online.™ Services Overview," *Pagoo.com, Inc. website page*, Mar. 3, 2000.

"pagoo™ The answer to missed calls while you're online.™ Press Releases," *Pagoo.com, Inc. website* pp. 1-2, Mar. 6, 2000.

"Internet Call Manager. And you could answer the call! Never miss a call again while you're online!," *GTE Internetworking website page*, Mar. 3, 2000.

"Internet Call Manager. And you could answer the call! About Internet Call Manager," *GTE Internetworking website* pp. 1-2, Mar. 3, 2000.

"Internet Call Manager. Tired of missing phone calls while you're online? System Requirements," *GTE Internetworking website page*, Mar. 3, 2000.

"Internet Call Manager. And you could answer the call! Using Internet Call Manager," *GTE Internetworking website* pp. 1-3, Mar. 3, 2000.

"Internet Call Manager. And you could answer the call! Frequently Asked Questions," *GTE Internetworking website* pp. 1-4, Mar. 3, 2000.

Low, C., "The Internet Telephone Red Herring", HP Laboratories Technical Report, May 15, 1996, pp. 1-15.

\* cited by examiner

METHOD AND APPARATUS FOR ALLOWING SELECTIVE DISPOSITION OF AN INCOMING TELEPHONE CALL DURING AN INTERNET SESSION

RELATED APPLICATION

This is a continuation application of U.S. patent application Ser. No. 08/991,079, "Method and Apparatus for Allowing Selective Disposition of an Incoming Telephone Call During an Internet Session" filed on Dec. 16, 1997 now U.S. Pat. No. 6,757,274.

BACKGROUND OF THE INVENTION

1. Field of the Invention

The present invention is directed to telephony and the internet, and more particularly, to a software tool for notifying an internet user of an incoming telephone call.

2. Background

The past several years have seen an explosive growth of the internet. Most of the increase in the popularity of the internet can be attributed to the information content available through the World Wide Web (the "Web"). The Web is built around a network of "server" computers which exchange requests and data from each other using the hypertext transfer protocol ("HTTP"). The Web consists of Web "pages" designed by a human designer using the Hypertext Markup Language ("HTML"). Each Web page contains graphical and text information. A new page may be accessed from the current page via a "hyperlink."

A user views a Web page using one of a number of commercially available "browser" programs. The browser submits an appropriate HTTP request to establish a communications link with a Web server on the network. A typical HTTP request references a Web page by its unique Uniform Resource Locator ("URL"). A URL identifies the Web server hosting that Web page, so that an HTTP request for access to the Web page can be routed to the appropriate Web server for handling.

A user requests internet access by subscribing to an Internet Service Provider ("ISP"). The ISP owns one or more internet server computers and provides access to other server computers for its subscribers. A user may connect to an ISP server in many ways, but the most common connection method is via a computer modem over conventional analog telephone lines. The user initiates a connection by dialing an ISP-provided access number from within a communications application, usually provided by the ISP. The application transmits user-provided data, such as a user name and password, over the user's computer modem to an application on the server computer. The server computer application confirms the user name and password and provides access to other internet servers. The user's communications application can then launch other internet applications, such as a Web browser.

While connected to the internet, however, the user may not receive any telephone calls over the analog telephone line. With the average internet user connected for over thirty minutes, internet users can frequently miss many important telephone calls. Call Waiting services do not provide an adequate solution to this problem. A user who subscribes to Call Waiting receives neither a visual nor an aural indication of an incoming telephone call. Moreover, many subscribers must disable the Call Waiting service because the Call Waiting transaction (usually one or two beeps) interrupts the user's modem connection to the internet, usually dropping the call.

Other current options available to the user are similarly inadequate. For instance, the user may subscribe to a voice mail service. But such services do not provide an indication to the user that a call and voicemail message were received. In addition, many voicemail services do not answer telephone calls received on a busy line. The user may also elect to purchase a second analog telephone line exclusively reserved for internet use. In most instances, however, the relatively brief time spent on the internet does not warrant the accompanying installation and monthly telephone service costs.

SUMMARY OF THE INVENTION

The present invention overcomes the problems and disadvantages of the prior art by storing the telephone number and internet protocol address of a user in the course of initiating an internet session. The stored information may be used to locate the user on the internet and notify her of an incoming telephone call. The invention also provides the user with information about the caller, such as the caller's name, street address, and telephone number. The internet user may then decide to: (1) ignore the call and continue working within the internet application; (2) accept the call and terminate the internet session; or (3) configure the incoming call as an internet telephony call so the internet session can continue.

In particular, in a preferred embodiment of the present invention, internet call notification software stored on an internet user's computer and advanced intelligent network software stored in a telephone network cooperatively notify the internet user of an incoming telephone call. The internet user sets the browser "home page" to the location of the internet notification software. The software then prompts the user, within the browser to activate the internet call notification. If the user requests notification, first an internet protocol ("IP") address is assigned by the user's internet service provider. Next, the software transmits the assigned IP address to the network using TCP/IP networking. The telephone network stores the IP address together with the user's telephone number in a database. When a subsequent telephone call is made to the user, the network accesses the database to determine if the user has an active internet session and, if so, to retrieve the IP address of the user. The telephone network then sends a message via the internet to the user's call notification software at the retrieved IP address. The personal computer software then displays a window providing information about the call, such as the calling party's name and telephone number along with options for the disposition of the telephone call. The user may elect to accept the telephone call or reject the call. If the user accepts the telephone call, the software closes the browser and connects the call to the user's telephone line. If the user rejects the telephone call, the software informs the network that the user has rejected the call. The network may then allow the call to ring on the calling party's end. Alternatively, the call may be forwarded to a specified alternate telephone number for the user.

In accordance with the purpose of the invention, as embodied and broadly described herein, the invention is a method for notifying an internet user of an incoming telephone call from a calling party, the method comprising the steps of storing an internet protocol address of the user; receiving the incoming telephone call; retrieving the stored internet protocol address of the user; sending a message to the internet protocol address; displaying information regarding the telephone call; and providing options to the internet user for the disposition of the call.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

FIG. 6 is a flow chart illustrating the interaction between calling party, internet call notification software and AIN software.

DETAILED DESCRIPTION OF THE PREFERRED EMBODIMENT

Reference will now be made in detail to a preferred embodiment of the invention, examples of which are illustrated in the accompanying drawings. Wherever possible, the same reference numbers will be used throughout the drawings to refer to the same or like parts.

Figure 1:
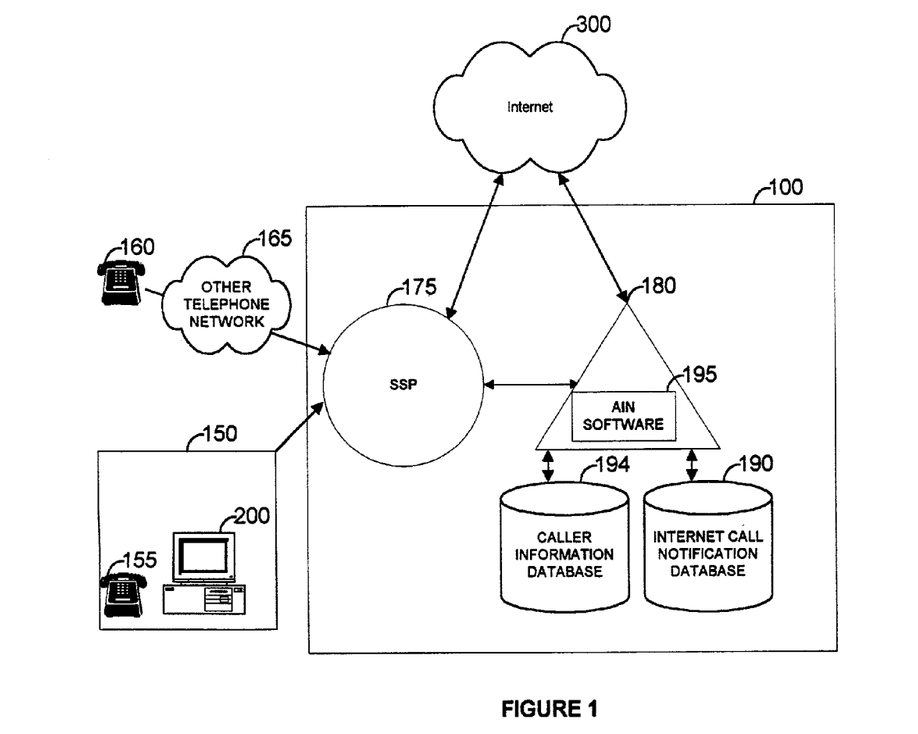
FIG. 1 is a block diagram of an exemplary telephone network, in accordance with a preferred embodiment of the present invention.

FIG. 1 is a block diagram of an exemplary advanced intelligent network ("AIN") network 100 interconnected via Signaling System #7 ("SS7"), in accordance with a preferred embodiment of the present invention. AIN functionality is described in described in Bellcore Documents No. GR-1298-CORE and GR-1299-CORE, which are both hereby incorporated by reference herein. SS7 signaling is described in detail in "American National Standard for Telecommunications—Signaling System Number 7, Nos. T1.110 through T1.116", which is hereby incorporated by reference herein. A calling party 160 and a called party/internet user 150 have access to the network 100. The called party 150 connects to the network 100 using either a standard telephone 155 or through a computer 200. The computer 200 connects to the network 100 by a computer modem 267 or a similar device. Both the modem 267 and the telephone 155 are coupled to a network connector on the user's premises, such as a telephone jack (not shown). A service switching point ("SSP") 175 switches calls to and from the internet user 150. The SSP may be located, for instance, in an end office coupled to the internet user's telephone jack.

The SSP 175 is communicatively coupled to an Advanced Intelligent Network Service Control Point ("AIN SCP") 180 or similar SS7-compatible device. The SSP 175 and AIN SCP 180 communicate via SS7 messaging and TCAP queries. TCAP queries are described in Bellcore Document No. GR-1298-CORE entitled "AIN GR: Switching Systems", Issue 3, Rev. November 1996, which is hereby incorporated by reference herein. The AIN SCP 180 accesses one or more databases, including an Internet Call Notification ("ICN") database 190 (discussed in greater detail below) and a caller information database 194. The AIN SCP stores information and accesses the ICN database 190 for ICN-related information. The caller information database contains information regarding individual callers, such as names, street addresses, and telephone numbers of subscribers and non-subscribers to the network. The user PC 200 (through the SSP 175) and the AIN SCP 180 are both communicatively coupled to the internet 300 using Transmission Control Protocol/Internet Protocol (TCP/IP) networking.

Figure 2:
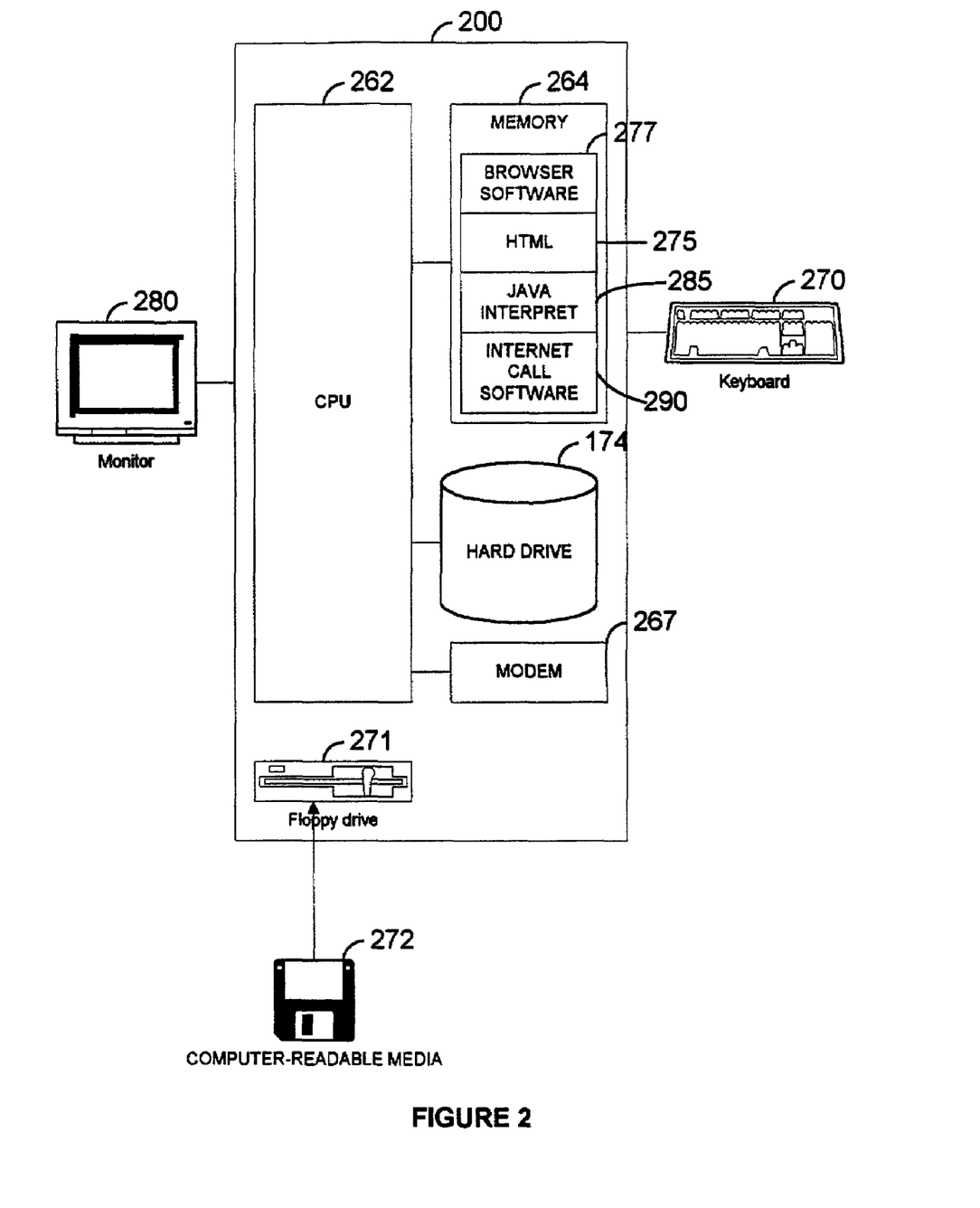
FIG. 2 is a block diagram of a computer, in accordance with a preferred embodiment of the present invention.

FIG. 2 is a block diagram of computer 200, in accordance with a preferred embodiment of the present invention. Computer 200 includes a CPU 262; a memory 264; input/output lines 265; a modem 267; an input device 270, such as a keyboard or mouse; and a display device 280, such as a display terminal. Computer 260 also includes an removable storage device 271, such as a disk drive, that reads computer instructions stored on computer readable media 272, such as a computer disk. Memory 264 of computer 260 includes browser software 277, such as the browser sold under the trademark "Netscape Navigator" by Netscape Communications, Inc., although other browsers may be used. Memory 264 also includes a computer display control language, such as the Hypertext Markup Language ("HTML") 275 and a Java interpreter 285. Browser software 277 may also include a plug-in that interprets the Java language or otherwise provides access to the internet call notification software described below. A person of ordinary skill in the art will understand that memory 274 also contains additional information, such as application programs, operating systems, data, etc., which are not shown in the figure for the sake of clarity.

The present invention includes two components: (1) an Internet Call Notification ("ICN") software component 290 stored on a local disk drive of computer 260 and read into memory 277 upon execution; and (2) an AIN software component 195 stored in AIN SCP 180 and associated databases 190, 194. The ICN component 290 and the AIN component 195 work together to provide notification to the internet user 200 of an incoming call. To ensure that the two components function properly, the internet user 200 pre-registers with his local exchange carrier ("LEC") for his service area.

Service Activation

Prior to use, the user 150 may configure the ICN software component 290 by specifying one or more default telephone numbers. For example, the user 150 may specify a cellular telephone number, a pager device number, and/or a voice-mail telephone number. During execution, the user selects one of the specified numbers for default handling of telephone calls during an internet session. The user interface may include methods to simplify the selection of the number to be used.

Figure 3:
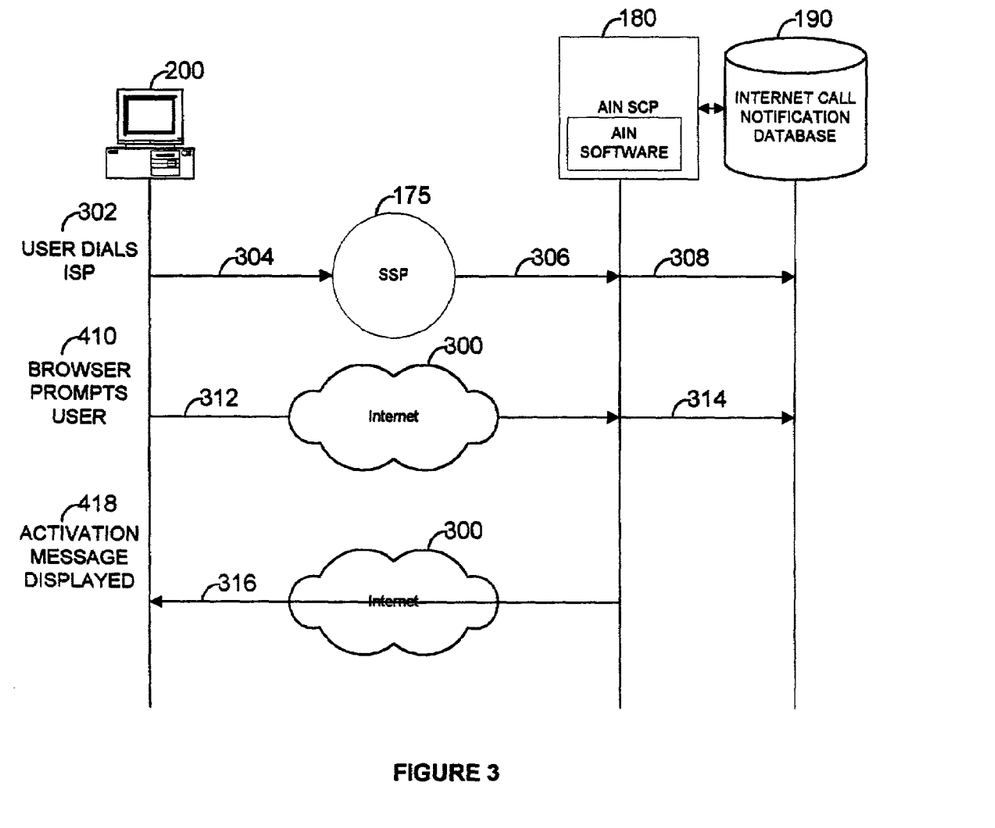
FIG. 3 is a flow chart illustrating the interaction between a calling party, internet call notification software, and AIN software.

FIG. 3 is a flow diagram illustrating the flow of data between internet user 200, ICN software 290, and AIN SCP 180 and its associated databases. It will be understood by persons of ordinary skill in the art that the steps of flow charts in this document are performed by CPU 262 of FIG. 1 executing the instructions of software 290 and a processor in AIN SCP 180. In step 302, the internet computer 200 initiates an internet session by dialing a remote server or point of presence ("POP") operated by the ISP. The dialed number includes a feature code dialing sequence, such as *99. In step 304, modem 267 sends calling digits of the remote server to SSP 175. The SSP 175 will automatically receive the telephone number of the internet user 150. An AIN feature code trigger is invoked in the SSP 175 and a resulting Info-Analyzed message is sent to the AIN SCP 180. Based on the dialed feature code, in step 306, the AIN SCP 180 creates an internet call entry 410 in the ICN database 190.

Figure 4:
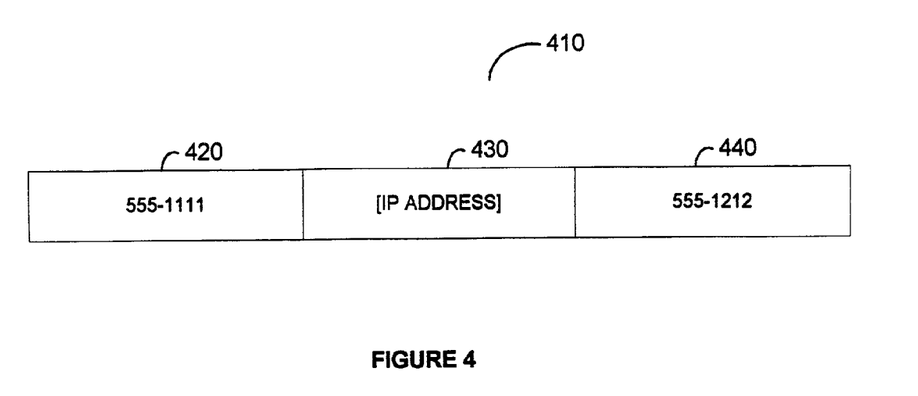

An example of the internet call entry 410 is shown in FIG. 4. The entry 410 includes a field 420 specifying the user's telephone number, a field 430 specifying the internet address of the user, and a field 440 specifying a default telephone number of the user, if available. The SSP 175 provides data for field 420. The internet address fields 430, 440 are left blank until the user has been assigned an internet address and requests activation of Internet Call Notification.

Once connected to the ISP server, the ISP assigns the user 200 an Internet Protocol ("IP") address to identify the user to other hosts on the Internet. The user 200 may then open browser software 277. Browser software 277 displays HTML and Java pages specified by HTTP requests. In addition, browser software 277 can display other HTML and Java documents located on the user's computer. Browser software allows the user to specify a "home page" as the initial document to be displayed by the browser software 277. In the present invention, the user sets the home page address as the local disk drive location of ICN software program 290 (e.g., "C:\ICN\ICN.EXE"). The ICN software program 290 is an executable stand-alone program or browser "plug-in" written in a programming language, such as the JAVA programming language. JAVA is a registered trademark of Sun Microsystems, Inc. JAVA programming is described in detail in The Waite Group's "Java Primer Plus," by Paul M. Tyma, Gabriel Torok, and Troy Downing (1996) which is incorporated by reference herein.

In step 310, the ICN software 290 causes the computer 200 to display a window that prompts the user to activate Internet Call Notification. The window includes a menu of pre-arranged option buttons. The user 200 may choose to be notified by selecting a "Yes" button in the window. If the user does not want to be notified of incoming calls, the user may select a "No" button in the window. The user may also specify one of the several default telephone numbers that were provided during configuration of the software. If the user 200 selects call notification, the ICN program 290 creates a data message, such as a User Datagram Protocol ("UDP") packet containing: (1) the user's current IP address; (2) the user's telephone number; and (3) the default telephone number. In step 312, the packet is sent directly to the AIN SCP 180 by the ICN software 290 using a domain name server that maps to a physical address for the AIN SCP 180. The AIN SCP 180 receives the data message and, in step 314, completes the database entry 310 by entering the user's IP address in the field 430, and the default telephone number in the field 440. The AIN SCP 180, in step 316, returns a confirmation message back to the user 200 over the Internet. In step 318, ICN software 290 causes browser 277 to display a message confirming activation of ICN.

Internet Call Notification and Disposition

Figure 5:
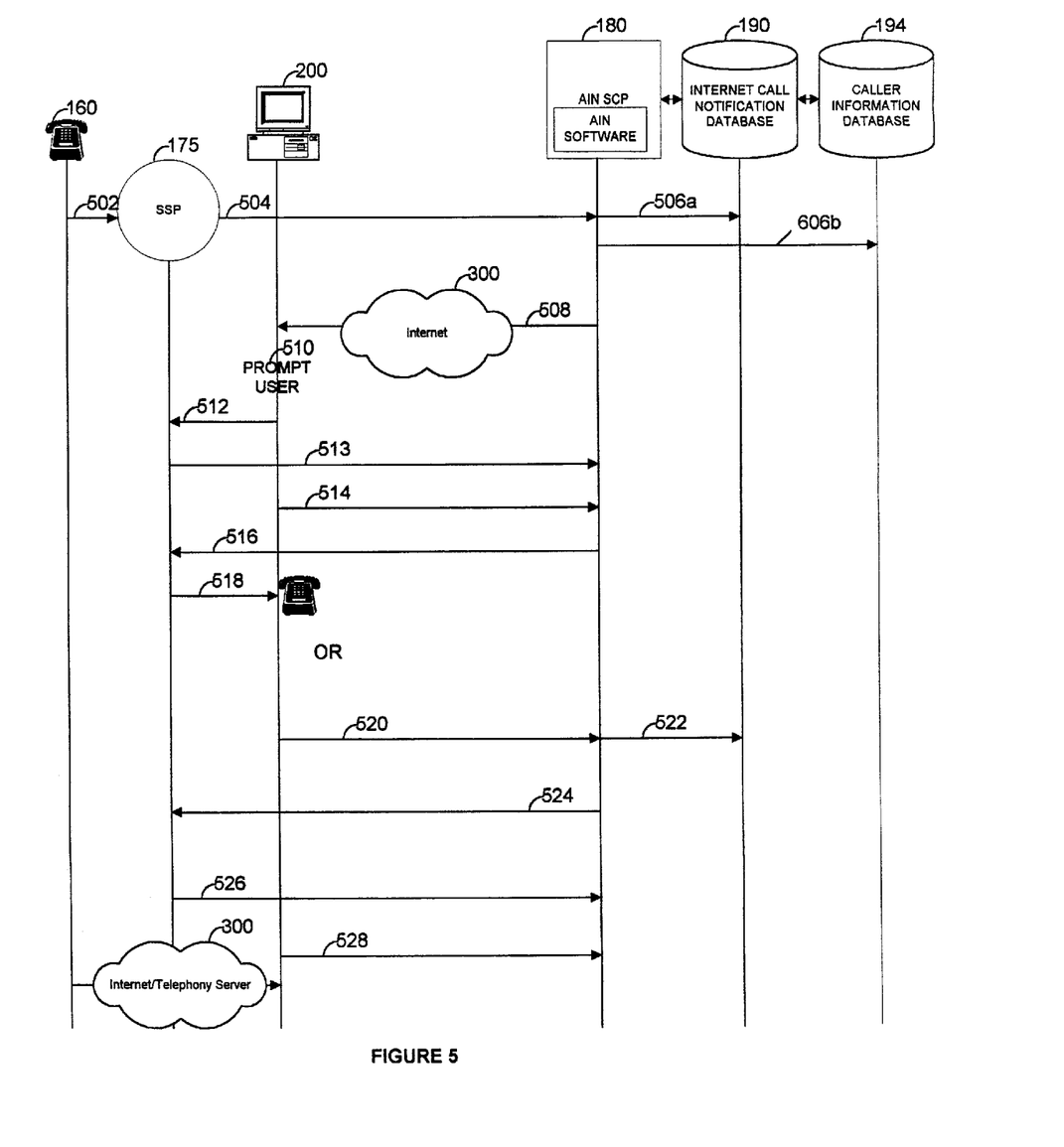
FIG. 5 is an illustration of an internet notification database entry.

FIG. 5 is a flow chart illustrating the interaction between calling party 160, ICN software 290 and AIN software 195. In step 502, a calling party 160 dials internet user 150. A telephone call by the calling party 160 to the user 150 will encounter an AIN trigger, such as the terminating busy trigger, in the SSP 175 prior to reaching the user's line. The terminating busy trigger captures a call to a busy telephone line without allowing the caller to hear a busy signal. The trigger is placed before a call waiting feature or any other terminating feature. Upon capturing the call, the SSP 175, in step 504, sends a TCAP query to the AIN SCP 180 for instructions regarding disposition of the telephone call. The AIN SCP 180 IN STEP 506*a* accesses the ICN database 190 and concludes that the user has an active internet session. The AIN SCP 180 then retrieves the IP address for the user from the IP address field 430 of the database entry 410. In addition, the AIN SCP 180, in step 506*b*, accesses the caller information database 194 to retrieve information regarding the calling party, if available. In step 508, the AIN SCP 180 sends a data message containing the calling party information to the user at the user's internet address. The message notifies the ICN software 290 of an incoming call.

The ICN software 290, in step 510, causes the computer 200 to display a window informing the user that a call is incoming and presenting the user with caller information. The window prompts the user to accept the call directly, to accept the call over the internet using computer telephony, or to ignore the call. If the user elects to accept the telephone call directly, the software 290, in step 512, terminates the connection between the modem and the ISP server. In step 513, the software 290 sends a call termination indication directly to the AIN SCP 180 using TCP/IP networking protocol. In addition, the SSP 175 sends a disconnect message to the AIN SCP 180 in step 514. The termination of the call and modem session are received by the SSP 175. The user's telephone line is then free to accept telephone calls. Based on the notification that the user has disconnected the telephone call, the AIN SCP 180, in step 516, sends an AIN TCAP message to the SSP 175, instructing the SSP 175 to complete the call from the calling party 160 to the user 200. In step 518, the user answers the call from calling party 170.

If the user elects not to accept the call at step 510, call flow continues at step 520. In step 520, the ICN software 290 either notifies the AIN SCP 180 that the user has chosen to ignore the call or the software 290 times out. In step 522, AIN SCP 180 accesses database 190 to determine the default telephone number specified by the user at start-up. In step 524, AIN SCP 180 sends a TCAP message instructing SSP 175 to route the telephone call from calling party 170 to the default telephone number received in step 522. If no answer is received at the specified telephone number, other default processing may be performed.

If the user elects to accept the call using internet telephony, the user must specify a telephony server IP address. In step 524, the address is transmitted back to the AIN SCP 180. The AIN SCP 180 then establishes a connection with the telephony server. Once the connection is established, the AIN SCP 180 provides the user's IP address to the server together with information about the calling party. The server may then connect the calling party 160 and the internet user 150.

What is claimed is:

1. In an Advanced Intelligent Network (AIN) including a service switching point (SSP) communicatively connected to a service control point (SCP), a method to set up and activate an internet call notification service for a user, comprising:

causing the SSP to receive notice of initiation of an internet session by the user;

causing the SSP to send a message to the SCP;

causing the SCP to create an internet call entry including a telephone number of the user;

causing the SCP to obtain an internet protocol address for the user;

causing the SCP to enter the internet protocol address in the internet call entry; and causing the SSP to set a termination attempt trigger with respect to the telephone number of the user, whereby the internet call notification service is set up in response to the notice of initiation of the internet session so as to prompt creation of an internet call entry including the telephone number of the user, and whereby the internet call notification service is activated in response to obtaining the internet protocol address for the user, inclusion of the internet protocol address in the internet call entry, and setting of the termination attempt trigger with respect to the telephone number of the user.

2. The method of claim 1, wherein causing the SSP to receive the notice of the initiation of the internet session by the user comprises causing the SSP to receive a call directed to a feature code and a dialed number of an internet service provider.

3. The method of claim 2, wherein causing the SSP to send the message to the SCP comprises causing the feature code to invoke the SSP to send the message to the SCP.

4. The method of claim 3, wherein the message from the SSP to the SCP comprises the feature code; and wherein causing the SCP to create the internet call entry including the telephone number of the uses comprises causing the feature code in the message to invoke the SCP to create the internet call entry.

5. The method of claim 1, further comprising:

causing the SCP to send confirmation of the activation of the internet call notification service to the user.

6. The method of claim 1, wherein the SCP obtains the internet protocol address for the user from a computer of the user.

7. The method of claim 1, wherein the SCP receives the internet protocol address for the user from an internet service provider.

8. The method of claim 6, wherein the internet protocol address included in the internet call entry is assigned to the computer of the user for the internet session.

9. The method of claim 1, further comprising:

causing the SSP to monitor the internet session for conclusion of the internet session;

in response to the conclusion of the internet session, causing the SSP to send information of the conclusion to the SCP; and causing the SCP in response to the information of the conclusion to remove the internet protocol address of the user.

10. The method of claim 9, wherein causing the SCP to remove the internet protocol address of the user comprises causing the SCP to remove the internet call entry.

11. The method of claim 1, wherein the SCP is operative to receive a default number with the internet protocol address for the user; and wherein the SCP is operative to enter the default number in the internet call entry.

* * * * *